United States Patent [19]
Fletcher et al.

[11] 3,863,881
[45] Feb. 4, 1975

[54] SHOCK ABSORBING MOUNT FOR ELECTRICAL COMPONENTS

[76] Inventors: James C. Fletcher, Administrator of the National Aeronautics and Space Administration with respect to an invention of; Robert F. Dillon, Jr., 17733 Contador Dr., Rowland Heights, Calif. 91748; Robert C. Mayne, 2465 Shields St., La Crescenta, both of Calif. 91214

[22] Filed: Sept. 10, 1973

[21] Appl. No.: 395,687

[52] U.S. Cl. .......................................... 248/358 R
[51] Int. Cl. ............................................. F16f 15/04
[58] Field of Search ........................... 248/20, 358 R

[56] References Cited
UNITED STATES PATENTS
3,185,415  5/1965  Thorn .......................... 248/358 R FOREIGN PATENTS OR APPLICATIONS
2,050,235  2/1971  France ......................... 248/358 R Primary Examiner—James C. Mitchell
Attorney, Agent, or Firm—Monte F. Mott; Wilfred Grifka; John R. Manning

[57] ABSTRACT

A shock mount having particular utility in mounting electrical components on circuit boards and the like. The mount is characterized by a first member of an endless configuration for receiving therewith an electrical component, such as a small relay, a second member of an endless configuration concentrically related to the first endless member, and a shock absorbing body of viscoelastic material interconnecting the first and second members, whereby the body of viscoelastic material substantially isolates the first member from the effects of shock to which the second member is subjected.

1 Claim, 6 Drawing Figures

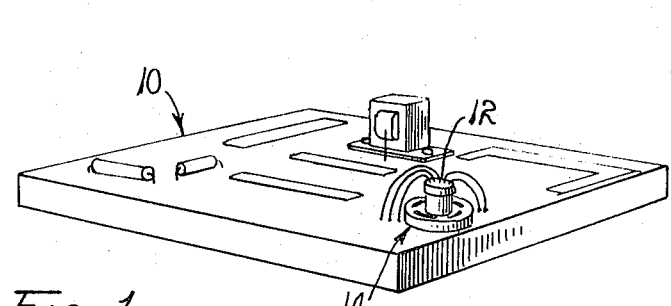
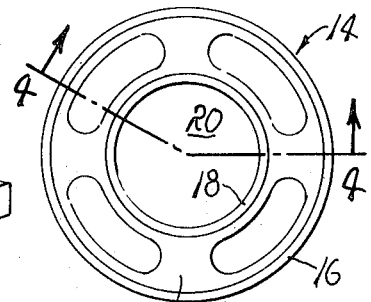
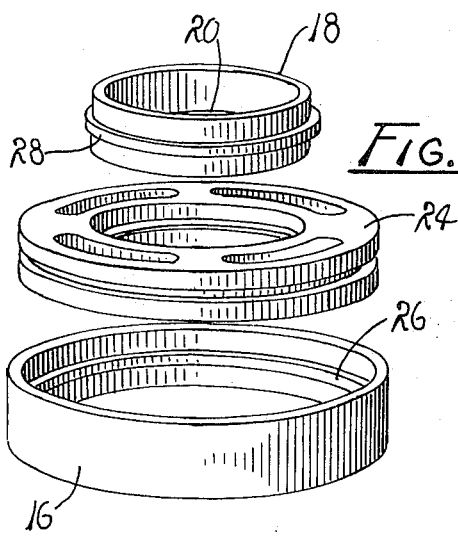
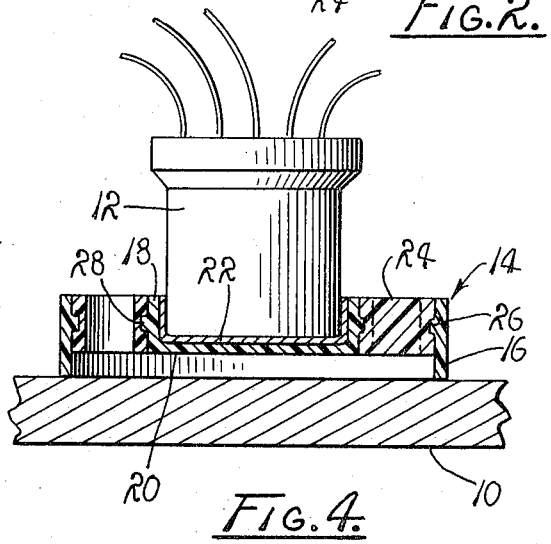
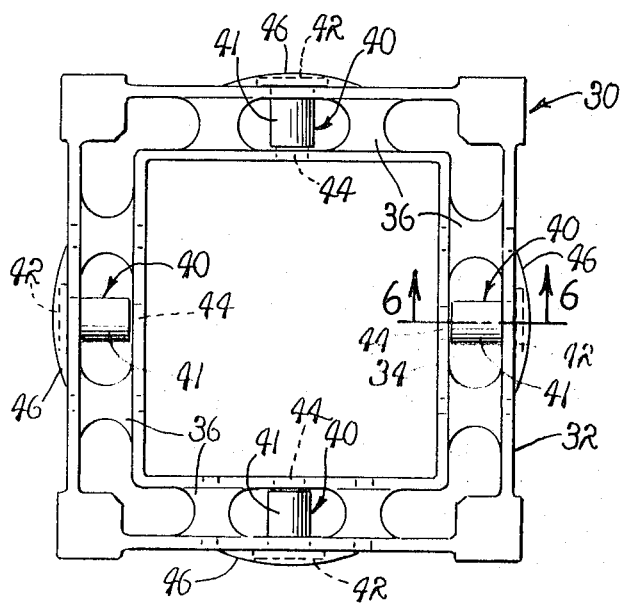
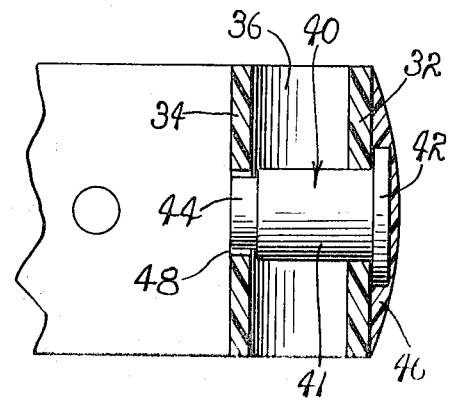

SHOCK ABSORBING MOUNT FOR ELECTRICAL COMPONENTS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The invention relates to shock absorbing mounts and more particularly to a shock absorbing mount for use in the fabrication of electronic subassemblies. As herein employed, the term "shock" refers to energy impulses, of varying magnitude, initiated by impact and/or vibratory motion.

2. Description of the Prior Art

As can readily be appreciated by those familiar with the fabrication of electronic subassemblies, certain circuit components have a propensity to fail when subjected to the effects of shock. This problem is, of course, accentuated in the spacecraft industry wherein severe mass and bulk limitations are imposed on packaged electronic systems. It is not unusual for delicate instruments to fail and small relays to chatter during launch and subsequently performed separation procedures.

In attempting to overcome the aforementioned problems and disadvantages, attempts have been made to provide shock absorbing systems for assemblies as well as for the subassemblies thereof. Unfortunately, such systems normally are bulky an generally ineffective.

It is, therefore, the general purpose of the instant invention to overcome the aforementioned difficulties by providing a shock absorbing mount for individual circuit components, such as relatively small relays and the like, which tend to be particularly sensitive to the effects of shock.

OBJECTS AND SUMMARY OF THE INVENTION

It is therefore an object of the instant invention to provide an improved shock absorbing mount.

It is another object to provide an improved shock absorbing mount particularly suited for use in mounting relays on circuit boards and the like.

It is another object to provide a shock absorbing mount for mounting very small electrical components on circuit boards and the like.

It is another object to provide an improved shock absorbing mount supported by a body of viscoelastic material for isolating an electrical component from the effects of shock to which supporting structure for the mount is subjected.

These and other objects and advantages are achieved through the use of a pair of concentrically related, similarly configured support members interconnected by a body of viscoelastic material, whereby the outer member serves as a base for the shock absorbing mount while the inner member serves to receive and support an electrical component, such as a small relay, substantially isolated from the effects of shock to which the outer member is subjected, as will hereinafter become more readily apparent by reference to the following description and claims in light of the accompanying drawings.

BRIEF DESCRIPTION OF THE DRAWINGS

FIG. 1 is a fragmented perspective view of a circuit board having mounted thereon a shock absoring mount embodying the principles of the instant invention.

FIG. 2 is a plan view of the shock absorbing mount, on somewhat of an enlarged scale, illustrating a concentric relationship for a first and second endless member arranged in a substantially concentric relationship and interconnected through a body of viscoelastic material.

FIG. 3 is an exploded perspective view of the mount shown in FIG. 2.

FIG. 4 is a cross-sectional view of the shock mount taken generally along line 4—4 of FIG. 2.

FIG. 5 is a top plan view of a modified form of the embodiment shown in FIGS. 1 through 4, which includes a plurality of snubbing pins employed for interconnecting the first and second members.

FIG. 6 is a fragmented view, on an enlarged scale, of one of the snubbing pins depicted in FIG. 5.

DESCRIPTION OF THE PREFERRED EMBODIMENT

Referring now with more specificity to the drawings wherein like reference characters designate like or corresponding parts throughout the several views, there is shown in FIG. 1 a circuit board, generally designated 10, upon which is mounted numerous electrical components for an electrical circuit, including a relay 12 seated in a shock absorbing mount 14 which embodies the principles of the instant invention.

For purposes of depicting the nature of the mount 14 and the fragility of the relay 12, it is to be understood that, as shown, the relay 12 has a diameter of approximately three-eighths of an inch and a height of approximately one-fourth of an inch. It also is to be understood, however, that the mount 14 may be employed in mounting electrical components of dfferent types and sizes in various types of subassemblies. Accordingly, it should be apparent that while the shock absorbing mount 14 which embodies the principles of the instant invention is particularly suited for use in supporting very small relays on circuit boards packaged for use aboard spacecraft, it can be employed for similar purposes in other environments.

The mount 14 includes a base 16, of a substantially cylindrical configuration, and a receiver 18 which has an outer configuration similar to that of the base. The base 16 and the receiver 18 are concentrically related while the base 16 is affixed to the circuit board 10 employing any suitable adhesive, such as an epoxy resin.

The receiver 18, within which the relay 12 is received and supported, includes a transversely oriented support plate 20 which imparts to the receiver a cup-shaped configuration. As a practical matter, a suitable cement 22 is employed in securing the relay 12 within the receiver 18.

In order to isolate the relay 12 from the effects of shock to which the circuit board 10 is, in operation, subjected, a body of viscoelastic material 24 is provided for interconnecting the base 16 and receiver 18. While the material from which the body 24 is fabricated can be varied as desired, one material which has been employed quite satisfactorily is commercially available as Solithane Formula 6 produced and marketed by the Thiokol Corp. When using this material, the body 24 is cast in place employing a hypodermic needle or the like.

It is here noted that while the body 24 possesses certain adhesive characteristics, it has, in practice, been found preferable to provide an annular shoulder 26 integral with and projected inwardly from the base 16. Similarly, an annular shoulder 28 integral with and projected outwardly from the receiver 18 is provided so that, in effect, the shoulders 26 and 28 are embedded in the body 24. By embedding the shoulders 26 and 28 in the body 24, a mechanical lock is established between the body and the contiguous base and receiver. The mechanical lock, of course, reduces the probability that the body will become disassociated from either the receiver 18 or the base 16 during periods in which the circuit board 10 is subjected to shock.

Turning now to FIG. 5, there is depicted a modified form of the embodiment heretofore described. The modified form of the invention, generally designated 30, is particularly suited for use in mounting relays and similar components housed in structure having a substantially rectangular configuration.

The embodiment 30, as shown, includes a base 32 interconnected through a body of viscoelastic material 36. It is to be understood that the base 32, the receiver 34 and the body of viscoelastic material 36 function in substantially the same manner to achieve substantially the same results as heretofore described with respect to the base 16. However, the mount 30 further includes a plurality of snubbing pins 40. Each of the snubbing pins 40 is of a substantially cylindrical configuration and includes a base portion 41 terminating at a head 42 and a distal portion of a substantially reduced diameter, designated 44.

The base portion 41 is seated in an opening, not designated, formed in the base 32 with the head 42 being seated thereagainst and secured in place by a suitable cement or epoxy resin designated 46. The distal portion 44, on the other hand, is seated in an opening 48 formed in the receiver 34. The diameter of the opening 48 is slightly larger than the diameter of the distal portion 44 of the snubbing pin. As a practical matter, a difference in diameters 0.036 inches has been found to be practical. Therefore, it can be appreciated that the pins 40 accommodate relative motion between the receiver 34 and the base 32. The purpose of the snubber pins 40 is to damp out unwanted harmonic motion imparted to the receiver 34. Consequently, the material from which the snubbing pins 40 is fabricated has a suitable modulus of rigidity so that the pins, in effect, are caused to act as resilient stops.

It is to be understood that the specific configurations of the mounts designated 14 and 30 are, in practice, varied as desired. Moreover, where desired, the snubbing pins 40 are employed with the mount 14 and there perform the same function ascribed thereto in connection with the description of their function within the mount 30. Moreover, while four snubbing pins laying on orthogonal axis of symmetry are illustrated in FIG. 5, it is to be understood that the number of such pins thus employed is varied, as desired, and the pins are, where preferred, eccentrically related with the intersecting axes of symmetry for the mount.

OPERATION

It is believed that in view of the foregoing description, the operation of the device will readily be understood and it will be briefly reviewed at this point.

With the shock absorbing mount 14 assembled in the manner hereinbefore described, it is cemented or otherwise similarly affixed to a circuit board 10, illustrated in FIG. 1. When so assembled, a relay, such as the relay 12, is cemented in place within the receiver 18. The relay 12 is then connected within an electrical circuit provided on the surface of the circuit board 10. Thus the mount 14 is prepared to be employed in supporting a single component on the circuit board 10 in isolation from the effects of shock to which the circuit board 10 is, in operation, subjected. When placed in an environment wherein the circuit board 10 is subjected to shock, the shock is transmitted from the board to the base of the mount. However, the receiver 18 is isolated from such shock due to the shock absorbing characteristics of the body 24.

The mount 30 is employed in substantially the same manner to achieve substantially the same results. Of course, when employing the mount 30 in an environment wherein the base 16 is subjected to vibratory motion, harmonic motion, and other motion imparted to the receiver 18 is damped out due to the effects of the pins 40.

In view of the foregoing, it should readily be apparent that the mounts 14 and 30 which embody the principles of the instant invention provide effective shock absorbing mounts for isolating individual components of an electrical circuit from effects of shock. Accordingly, it should be apparent that through the instant invention there has been a practical solution to the perplexing problem of providing suitable mounts for effectively isolating relatively small components of electrical circuits from the effects of shock.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. A shock absorbing mount for use in mounting electrical components comprising:
   A. means including a first member of an endless configuration adapted to receive in supporting relation an electrical component;
   B. a second member of an endless configuration circumscribing the first member;
   C. means for supporting said first member for motion relative to said second member, including a body of viscoelastic material interposed between said first and second members and affixed thereto;
   D. means defining within said first member a first endless array of openings and means defining in said second member a second endless array of openings coaxially aligned with the openings of said first array; and
   E. motion damping means mounted on said second member for limiting motion imparted to said first member relative to said second member, including an endless array of coplanar, rigidly supported snubbing pins disposed in an opposed relationship and extended through the openings of said second array of openings and into the openings of said first array, each of said snubbing pins being characterized by an elongated body having a base end portion rigidly connected with said second member and a distal end portion for engaging said first member having a diameter substantially less than the diameter of the openings of said first array of openings, and an annular shoulder disposed in closed proximity with said first member, whereby each of said snubbing pins is rigidly fixed to said second member and adapted to engage said first member as motion relative to said second member is imparted to said first member.

* * * * *